United States Patent [19]

Kervagoret

[11] Patent Number: 5,174,637
[45] Date of Patent: Dec. 29, 1992

[54] HYDRAULIC BRAKING CIRCUIT

[75] Inventor: Gilbert Kervagoret, Argenteuil, France

[73] Assignee: Bendix Europe Services Techniques, Drancy, France

[21] Appl. No.: 842,774

[22] Filed: Mar. 2, 1992

Related U.S. Application Data

[63] Continuation of Ser. No. 557,300, Jul. 23, 1990, abandoned.

[30] Foreign Application Priority Data

Jul. 27, 1989 [FR] France ............... 89 10131

[51] Int. Cl.⁵ .................................... B60T 13/14
[52] U.S. Cl. ..................... 303/117.1; 303/116.1; 303/119.1
[58] Field of Search ............ 303/117, 113 SS, 113 R, 303/114 R, 116 R, 116 SP, 115 PP, 119 R, DIG. 3, DIG. 4

[56] References Cited

U.S. PATENT DOCUMENTS

| 4,362,339 | 12/1982 | Belart ....................... 303/117 |
| 4,462,642 | 7/1984 | Leiber .................... 303/DIG. 4 |
| 4,768,843 | 9/1988 | Baughman et al. ...... 303/DIG. 4 |
| 4,836,618 | 6/1989 | Wakata et al. .......... 303/DIG. 4 |
| 4,842,344 | 6/1989 | Kuwana et al. ............... 303/117 |
| 4,844,558 | 7/1989 | Ishii et al. ................ 303/116 R |
| 4,940,295 | 7/1990 | Adachi et al. ................ 303/117 |

FOREIGN PATENT DOCUMENTS

| 0230213 | 7/1987 | European Pat. Off. . |
| 0320943 | 6/1989 | European Pat. Off. . |
| 2419010 | 11/1974 | Fed. Rep. of Germany . |
| 3821225 | 2/1989 | Fed. Rep. of Germany . |
| 2440854 | 6/1980 | France . |
| 2538329 | 6/1984 | France . |
| 0074447 | 3/1990 | Japan ............................. 303/117 |
| 2051985 | 1/1981 | United Kingdom . |
| 2207721 | 2/1989 | United Kingdom . |

Primary Examiner—Matthew C. Graham
Attorney, Agent, or Firm—Larry J. Palguta; Ken C. Decker

[57] ABSTRACT

A hydraulic braking circuit comprises at least one brake fluid source (26, 36), a master cylinder (10), the outlets of which are connected to at least one sub-circuit comprising at least one brake motor (14, 16), and which is controlled by way of a pedal (12), and an electronic control unit (22). It also comprises a pressure generator (24), and an electrovalve (28, 30) which is arranged in each sub-circuit, so as to establish a connection, when at rest, between the outlets of the master cylinder (10) and the associated brake motors (14, 16) and, in the excited position, between the outlets of the generator (24) and the associated brake motors (14, 16), the control unit (22) being capable of simultaneously controlling the functioning of the pressure generator (24) and the excitation of the electrovalve (28, 30).

2 Claims, 1 Drawing Sheet

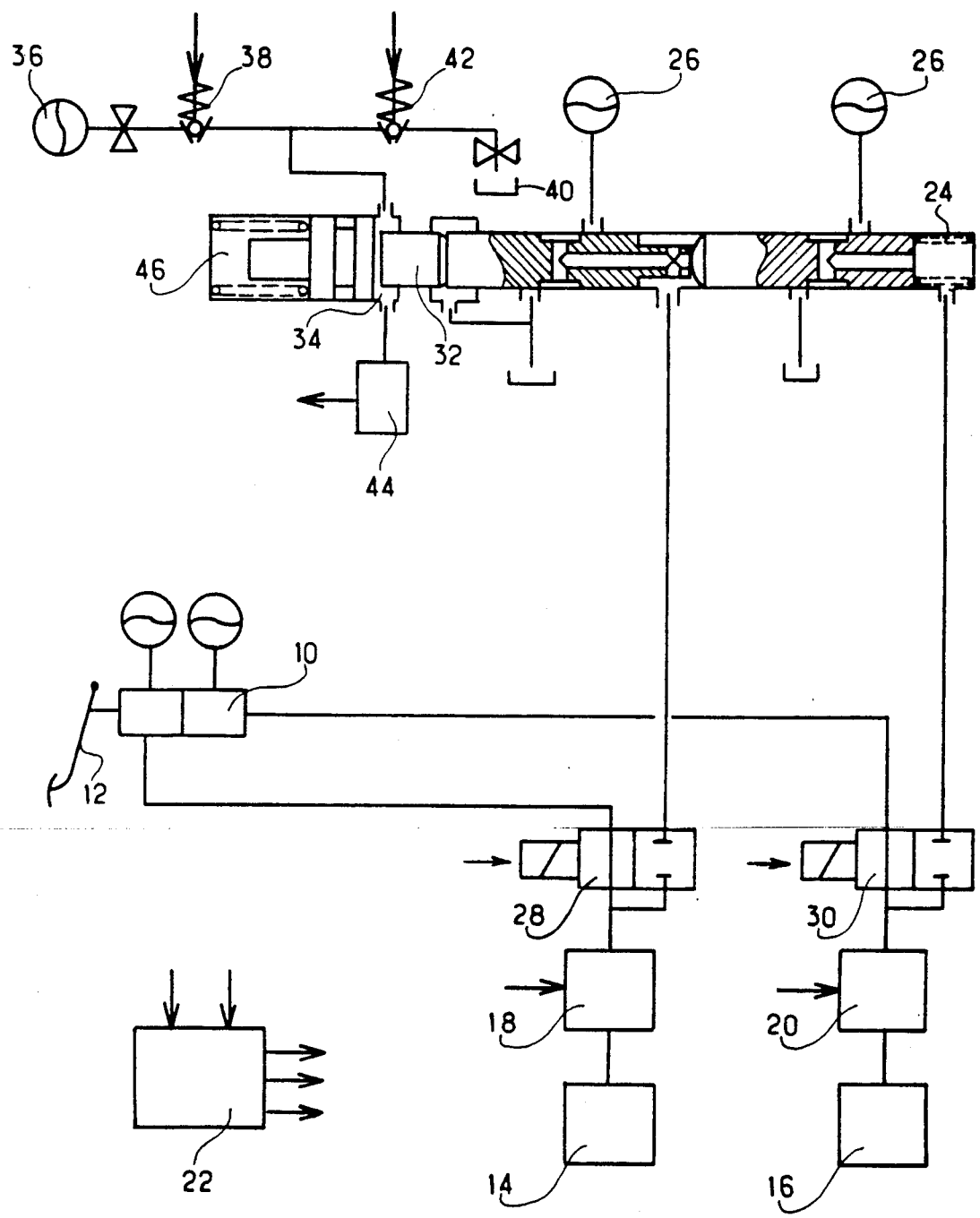

5,174,637

HYDRAULIC BRAKING CIRCUIT

This is a continuation of abandoned application Ser. No. 07/557,300 filed Jul. 23, 1990, now abandoned.

BACKGROUND OF THE DISCLOSURE

The present invention relates to a hydraulic braking circuit, in particular for a motor vehicle, and more particularly a circuit of this type which allows automatic braking controlled by an electronic control unit to be achieved.

Automatic braking systems have numerous advantages as regards safety. For example, they allow a vehicle to be slowed and even stopped when an obstacle is detected, for example by an on-board radar, even though the driver of the vehicle has not seen this obstacle.

Moreover, when combined with an appropriate logic, they allow an anti-skid function during acceleration and/or an anti-lock function to be performed.

So as not to have any abnormal effects, a system of this type must function exactly as a driver would, in other words with the necessary progressiveness and smoothness. Furthermore, its cost must not be excessive.

The subject of the present invention is a hydraulic braking circuit for a system of this type.

The invention therefore relates to a hydraulic braking circuit comprising at least one brake fluid source, a master cylinder, the outputs of which are connected to at least one sub-circuit comprising at least one brake motor, and which is controlled by means of a pedal, and an electronic control unit.

SUMMARY OF THE INVENTION

According to the present invention, this circuit also comprises a pressure generator, and an electrovalve which is arranged in each sub-circuit, so as to establish a connection, when at rest, between the outlets of the master cylinder and the associated brake motors and, in the excited position, between the outlets of the generator and the associated brake motors, the control unit being capable of simultaneously controlling the functioning of the pressure generator and the excitation of the electrovalve.

Preferably, the fluid source is a high-pressure fluid source and the pressure generator is a distributor whose inlets are connected to the source.

More preferably still, the distributor comprises a control chamber connected respectively on the one hand to the pressurized fluid source and on the other hand to the reservoir by means of at least one electrovalve which is also controlled by the control unit.

Advantageously, a pressure sensor is hydraulically connected to the control chamber and delivers to the control unit a signal, which is a function of the pressure of the liquid in this chamber so as to control this pressure.

Preferably, the control chamber is connected with the chamber of a pressure accumulator.

BRIEF DESCRIPTION OF THE DRAWING

The invention will be better understood and further objects, advantages and features of it will become more evident upon reading the description below of an embodiment given with no limitation being implied and to which a sheet of drawing is attached in which:

The single FIGURE shows, diagrammatically, a hydraulic circuit according to the invention.

DETAILED DESCRIPTION OF THE INVENTION

Referring now to this FIGURE, a person skilled in the art will first of all recognize a conventional braking circuit comprising a tandem master cylinder 10 which is controlled by means of a pedal 12 and two sub-circuits which are connected to the outlets of the master cylinder 10 for supplying two sets of brake motors, 14 and 16 respectively, by means of an anti-lock device for the wheels 18, 20 which is controlled by an electronic control unit 22 which receives, in particular, information from various sensors which are not shown in the FIGURE.

In the example illustrated, the master cylinder is a hydraulic servomotor which is fed with pressurized fluid. The circuit would obviously function identically if a pneumatic servomotor and a simple reservoir of low-pressure fluid were used.

In order to achieve the automatic braking function, a distributor 24 has been added to the circuit parallel to the master cylinder 10. This distributor 24 is in practice a twin measuring apparatus comprising two valves, for example slide valves, which are capable of sliding open axially so as to effect a connection between reservoirs of pressurized fluid and the corresponding outlets. The latter are connected to the sub-circuits of the master cylinder 10 by means of an electrovalve at two positions, 28 and 30 respectively, in such a way that, when at rest, the outlets of the master cylinder 10 are connected with the sets of brake motors 14, 16.

The axial sliding of the slide valves of the measuring apparatus 24 is achieved by means of a piston 32 which slides in a chamber 34 capable of being fed with pressurized fluid from a source 36, an electrovalve 38 controlling the intake of the fluid into the chamber 34, which chamber is also connected to a reservoir of low-pressure fluid 40 by means of an electrovalve 42 controlling the release of the fluid into the chamber 34.

Advantageously, a pressure sensor 44 is hydraulically connected to this chamber 34 so as to send the control unit 22 a signal corresponding to this pressure which prevails in the chamber 34. A sensor 44 of this type therefore allows the progressiveness and the smoothness of automatic braking to be carefully adjusted.

The circuit functions as follows.

In the case of normal braking, the electrovalves 28 and 30 are in the position of rest shown and the actuation of the pedal 12 causes the brake motors 14 and 16 to be supplied, a supply which can be adjusted, if required, by anti-lock devices 18, 20.

In automatic braking, as soon as the control unit 22 has received the order to supply the brake motors 14, 16, the electrovalves 28 and 30 are excited so as to connect these motors and the outlets of the distributor 24, and the control unit 22 also controls the opening of the intake electrovalve 38, so as to increase the pressure in the chamber 34, which causes the piston 32 to be displaced and the slide valves of the distributor 24 to open. The pressure sources 26 are then connected with the brake motors 14, 16.

In order to control the desired deceleration, the control unit 22, which receives information on the speed of the wheels by means of appropriate sensors and on the pressure of the fluid in the chamber 34 by means of the sensor 44, opens and/or closes the intake 38 and release 42 electrovalves so as to achieve the desired effect.

When this effect is produced, the release electrovalve 42 is opened and the two electrovalves 28, 30 return to their position of rest, thus isolating the distributor 24 from the brake motors 14, 16 and connecting the latter to the conventional master cylinder 10.

In automatic braking, so as to avoid an excessively sudden initial braking, the control chamber 34 is connected to the chamber of a pressurized fluid accumulator or pressure retaining means 46 which comprises a single piston sliding counter to a compression spring.

Also preferably, when braking automatically, the electronic control unit 22 acts upon the thermal motor and/or upon the clutch as would any driver of the vehicle.

The circuit which has just been described allows, quite evidently, a vehicle to be braked automatically in response to a danger, for example detected by an onboard radar or signalled by a radio beacon carefully positioned on the side of the road, or by any other equivalent means.

It also allows the wheel anti-skid function during acceleration to be ensured, in particular on an icy road.

Indeed, when the sensors, which are not shown, of the speed of the wheels detect a skid, the control unit 22 can choose to automatically brake the wheels so as to prevent this skid, the anti-lock device 18, 20 then preventing the wheels from passing from a skid state to a locked state.

Likewise, in the absence of the anti-lock devices 18 and 20, the distributor 24 can perform the anti-lock function as a result of it being possible to obtain a rapid release of the pressure in the brake motors 14, 16 with the release electrovalve 42.

Although only one preferred embodiment of the invention has been described, it is evident that it will be possible for a person skilled in the art to make numerous modifications without going beyond the scope of the present invention as defined by the attached claims. In particular, the circuit can function with any other type of pressure generator.

It will also be possible to provide for a malfunction detector to be attached to the pressure generator, the malfunction detector allowing the electronic control unit 22 to be prevented from exciting the electrovalves 28 and 30 and the driver to be warned of the malfunction of the automatic braking system.

Similarly, by arranging a master cylinder malfunction indicator, which is connected to the control unit between the outlets of the master cylinder 10, it is possible for the latter to detect the desire of the driver to brake the vehicle when he applies pressure to the pedal 12 and, as a function of the force exerted by the driver on this pedal, to cause the generator 24 to function instead and in place of the master cylinder so as to ensure the safety of the system.

What we claim is:

1. A hydraulic braking circuit comprising at least one pressurized fluid source, a master cylinder controlled by means of a pedal and with outlets connected to sub-circuits each comprising at least one brake motor, an electronic control unit, a pressure distributor whose inlets are connected to said pressurized fluid source and for distributing fluid from said pressurized fluid source, and an electrovalve which is arranged in each sub-circuit so as to establish a connection, when at rest, between the respective outlet of said master cylinder and the respective brake motor and, in an activated position, between a respective outlet of said distributor and the respective brake motor, said distributor being pressure piloted and comprising a control chamber connected selectively to said pressurized fluid source and to a reservoir of low-pressure fluid by means of at least one solenoid valve which is controlled by said control unit, said control unit controlling simultaneously the activation of each said electrovalve and including said solenoid valve which controls the functioning of said distributor, and said control chamber communicating on one side with pressure retaining means and on the other side with a piston comprising slide valve means of said distributor, such that said slide valve means of the distributor is pressure piloted by operation of the solenoid valve and fluid from the pressurized fluid source distributed to the electrovalve of each sub-circuit.

2. The circuit according to claim 1, wherein a pressure sensor is hydraulically connected to said control chamber and delivers to said control unit a signal which is a function of fluid pressure in said control chamber so as to control fluid pressure in the control chamber.

* * * * *